United States Patent [19]
Mori

[11] Patent Number: 5,146,349
[45] Date of Patent: Sep. 8, 1992

[54] FACSIMILE APPARATUS WHICH CAN COORDINATE COMMUNICATION WITH MORE THAN ONE EXTERNAL APPARATUS

[75] Inventor: Yukikazu Mori, Ebina, Japan

[73] Assignee: Ricoh Company, Ltd., Tokyo, Japan

[21] Appl. No.: 684,276

[22] Filed: Apr. 12, 1991

[30] Foreign Application Priority Data

Apr. 27, 1990 [JP] Japan .................. 2-110649

[51] Int. Cl.⁵ ............................ H04N 1/32
[52] U.S. Cl. ............................ 358/407
[58] Field of Search ............ 358/400, 407–409, 358/434

[56] References Cited

U.S. PATENT DOCUMENTS

| | | | |
|---|---|---|---|
| 4,058,672 | 11/1977 | Crager et al. | 358/407 |
| 4,922,348 | 5/1990 | Gillon et al. | 358/407 |
| 5,040,077 | 8/1991 | Hamano | 358/434 |

FOREIGN PATENT DOCUMENTS

58-184866 10/1983 Japan .
1-314051 12/1989 Japan .

Primary Examiner—Stephen Brinich
Attorney, Agent, or Firm—Oblon, Spivak, McClelland, Maier & Neustadt

[57] ABSTRACT

A facsimile apparatus ignores or rejects a requirement to connect with a second external apparatus if the facsimile apparatus is communicating with the first external apparatus when the second external apparatus transmits the predetermined signal to the facsimile apparatus. But the facsimile apparatus memorizes the second external apparatus. After the communication with the first external apparatus, the facsimile apparatus asks the second external apparatus to connect therewith in order to transmit image data. According to the present invention, the second external apparatus is prevented from transmitting the predetermined signal more than twice. The present invention is applicable to a facsimile apparatus used for an integrated digital network.

16 Claims, 7 Drawing Sheets

FIG.4A

| PROTOCOL DISCRIMINATER |
| --- |
| CALL REFERENCE |
| MESSAGE TYPE |
| MANDATORY INFORMATION ELEMENT |
| INFORMATION ELEMENT |

FIG.4B

| BEARER CAPABILITY |
| --- |
| CALLING PARTY NUMBER |
| CALLED PARTY NUMBER |
| LOW LAYER COMPATIBILITY |
| HIGH LAYER COMPATIBILITY |

FIG.4C

| CAUSE |
| --- |
| DISPLAY |

FACSIMILE APPARATUS WHICH CAN COORDINATE COMMUNICATION WITH MORE THAN ONE EXTERNAL APPARATUS

BACKGROUND OF THE INVENTION

The present invention relates generally to a facsimile apparatus, a facsimile communication system, and a method for controlling facsimile apparatuses. The present invention is effective for a facsimile apparatus used for an integrated services digital network (called ISDN for short).

With the recent advances in ISDN construction, facsimile apparatuses used for the ISDN have been accordingly developed. The ISDN is supposed to replace the public services telephone network (called PSTN for short), however, until this actually happens, it is necessary to reconcile the use of the ISDN with that of the PSTN, and thus information must be transmitted between a terminal of the ISDN and that of the PSTN. Hereupon, a facsimile apparatus has been developed to serve as a group 4 facsimile apparatus, which is mainly used for the ISDN, and a group 3 facsimile apparatus, which is mainly used for the PSTN. These facsimile apparatuses use multichannel basic interfaces for the ISDN, such as two data channels (called B-channels hereinafter) and a one signal channel (called D-channel hereinafter). The B-channels are mainly used for data transmission, and the D-channel is mainly used for a call control. Therefore, a data transmission through one of the B-channels can take place almost simultaneously with a call accepted through the D-channel. And the B-channels are usually controlled by a single transmission controller so that the data transmission through one B-channel cannot take place simultaneously with data transmission from the other B-channel. Additionally, a facsimile apparatus ignores or rejects an incoming call based on an outgoing call from a terminal while it is communicating with another terminal since one of the B-channels is being used. Consequently, the terminal transmits the same outgoing call to the facsimile apparatus after the communicating is finished. Therefore, the outgoing call must be unnecessarily repeated. On the other hand, a facsimile apparatus which can control both B-channels simultaneously is expensive. In addition, a general facsimile apparatus is limited as regards reoutgoing call times so that the calling terminal sometimes fails to communicate with the facsimile apparatus in a case where the facsimile apparatus is communicating for a long period of time.

SUMMARY OF THE INVENTION

Accordingly, it is a general object of the present invention to provide a novel and useful facsimile apparatus in which the above disadvantages are eliminated.

Another object of the present invention is to provide an inexpensive facsimile apparatus in which unnecessary outgoing calls are prevented.

The more specific object of the present invention is to provide a facsimile apparatus for transmitting information to an external apparatus and/or receiving information therefrom via a transmission line, the information comprising first and second information, the first information comprising image data representing a predetermined image, the second information comprising control information by which the facsimile apparatus and the external apparatus are connected and/or disconnected with each other, the second information including identification information by which the facsimile apparatus and the external apparatus identify each other, the transmission line comprising a plurality of first channels through one of which the first information is transmitted, and at least one second channel through which the second information is transmitted, each of the first channels being operatively interconnectable to the facsimile apparatus and/or the external apparatus, the first information being incapable of being transmitted simultaneously via more than two of the first channels to which the facsimile apparatus is simultaneously operatively interconnectable, and the second channel being operatively interconnectable to the facsimile apparatus and/or the external apparatus, which facsimile apparatus comprises scanning means for scanning the predetermined image so as to generate the image data, an interface operatively interconnectable to the transmission line, a memory, coupled to the scanning means and interface, to store the first and/or second information therein, first control means, operatively interconnected to the interface and memory, for controlling transmitting and/or receiving of the first and/or second information via the interface, second control means, operatively interconnected to the first control means, for controlling the first control means, the second control means instructing the first control means, if first or second information is being transmitted between the first control means and a first external apparatus when the first control means receives the second information from a second external apparatus, not to connect the facsimile apparatus to the second external apparatus via one of the first channels, and to store first identification information representing the second external apparatus included in the second information from the second external apparatus in the memory, and the second control mean instructing the first control means, after the transmission of the first information between the first control means and the first external apparatus, to transmit the second information to the second external apparatus by means of the first identification information stored in the memory in order to ask the second external apparatus to transmit the first information to the facsimile apparatus so that the first control means can receive the first information to be transmitted from the second external apparatus and the second external apparatus can be prevented from transmitting the second information more than twice to the facsimile apparatus, and plotter means, responsive to the first control means, for plotting the predetermined image appropriate to the image data which the first control means receives from the external apparatus.

Another more specific object of the present invention is to provide a facsimile communication system comprising a transmission line and a plurality of facsimile apparatus, operatively interconnected to said transmission line, each facsimile apparatus transmitting and/or receiving information to/from each other via the transmission line, the information comprising first and second information, the first information comprising image data representing a predetermined image, the second information comprising control information by which facsimile apparatuses are connected and/or disconnected with each other, the second information including identification information by which facsimile apparatuses identify each other, the transmission line comprising a plurality of first channels through one of which the first information is transmitted, and at least one second channel through which the second information is transmitted, each of the first channels being operatively interconnectable to each facsimile apparatus, the first information being incapable of being transmitted simultaneously via more than two of the first channels to which a facsimile apparatus is simultaneously operatively interconnected, and the second channel being operatively interconnectable to each the facsimile apparatus, each facsimile apparatus comprising scanning means for scanning the predetermined image so as to generate the image data, an interface operatively interconnectable to the transmission line, a memory coupled to the scanning means and interface to store the first and/or second information therein, first control means, operatively interconnected to the interface and memory, for controlling transmitting and/or receiving of the first and/or second information via the interface, second control means, operatively interconnected to the first control means, for controlling the first control means, and plotter means, responsive to the first control means, for plotting the predetermined image appropriate to the image data which the first control means receives from the facsimile apparatus, and when first or second information is being transmitted between first and second facsimile apparatuses when the first control means of the first facsimile apparatus receives the second information from a third facsimile apparatus, the second control means of the first facsimile apparatus instructs the first control means of the first facsimile apparatus not to connect the first facsimile apparatus to the third facsimile apparatus via one of the first channels, and to store first identification information representing the third facsimile apparatus included in the second information from the third facsimile apparatus in the memory of the first facsimile apparatus, and after the transmission of the first information between the first and second facsimile apparatuses, the second control means of the first facsimile apparatus instructs the first control means of the first facsimile apparatus to transmit the second information to the third facsimile apparatus by means of the first identification information stored in the memory of the first facsimile apparatus in order to ask the third facsimile apparatus to transmit the first information to the first facsimile apparatus, the second control means of the third facsimile apparatus instructing the first control means of the third facsimile apparatus, if the first control means of the third facsimile apparatus transmits the second information to the first facsimile apparatus when the first or second information is being transmitted between first and second facsimile apparatuses so that the first control means of the third facsimile apparatus cannot transmit the first information to the first facsimile apparatus, to prepare to transmit the first information to the first facsimile apparatus, and the second control means of the third facsimile apparatus instructing the first control means of the third facsimile apparatus, if the first facsimile apparatus transmits the second information to the third facsimile apparatus in order to ask the third facsimile apparatus to transmit the first information to the first facsimile apparatus, to transmit the first information to the first facsimile apparatus so that the first facsimile apparatus can receive the first information to be transmitted from the third facsimile apparatus and the third facsimile apparatus can be prevented from transmitting the second information more than twice to the first facsimile apparatus.

The further more specific object of the present invention is to provide a method for controlling facsimile apparatuses for transmitting and/or receiving information to/from each other via a transmission line, the information comprising first and second information, the first information comprising image data representing a predetermined image, the second information comprising control information by which facsimile apparatuses are connected with and/or disconnected from each other, the second information including identification information by which facsimile apparatuses identify each other, the transmission line comprising a plurality of first channels through one of which the first information is transmitted, and at least one second channel through which the second information is transmitted, each of the first channels being connectable to each facsimile apparatus, the first information being incapable of being transmitted simultaneously via more than two of the first channels to which a facsimile apparatus is simultaneously operatively interconnected, and the second channel being operatively interconnectable to each facsimile apparatus, which method comprises the steps of instructing a first facsimile apparatus, if first or second information is being transmitted between first and second facsimile apparatuses when the first facsimile apparatus receives the second information from a third facsimile apparatus, not to connect the first facsimile apparatus with the third facsimile apparatus, instructing the first facsimile apparatus to memorize first identification information representing the third facsimile apparatus included in the second information from the third facsimile apparatus, instructing the first facsimile apparatus, after the transmission of the first information between the first and second facsimile apparatuses, to transmit the second information to the third facsimile apparatus by means of the first identification information memorized in order to ask the third facsimile apparatus to transmit the first information to the first facsimile facsimile apparatus, instructing the third facsimile apparatus, if the third facsimile apparatus transmits the second information to the first facsimile apparatus when the first or second information is being transmitted between the first and second facsimile apparatuses so that the third facsimile apparatus cannot transmit the first information to the first facsimile apparatus, to prepare to transmit the first information to the first facsimile apparatus, and instructing the third facsimile apparatus, if the first facsimile apparatus transmits the second information to the third facsimile apparatus in order to ask the third facsimile apparatus to transmit the first information to the first facsimile apparatus, to transmit the first information to the first facsimile apparatus so that the first facsimile apparatus can receive the first information to be transmitted from the third facsimile apparatus and the third facsimile apparatus can be prevented from transmitting the second information more than twice to the first facsimile apparatus.

According to the present invention, the second external apparatus or the third facsimile apparatus can be prevented from transmitting the second information more than twice without the need to make the facsimile apparatus very expensive.

Other objects and further features of the present invention will become apparent from the following detailed description when read in conjunction with the accompanying drawings.

DESCRIPTION OF THE PREFERRED EMBODIMENTS

Figures 1, 2:
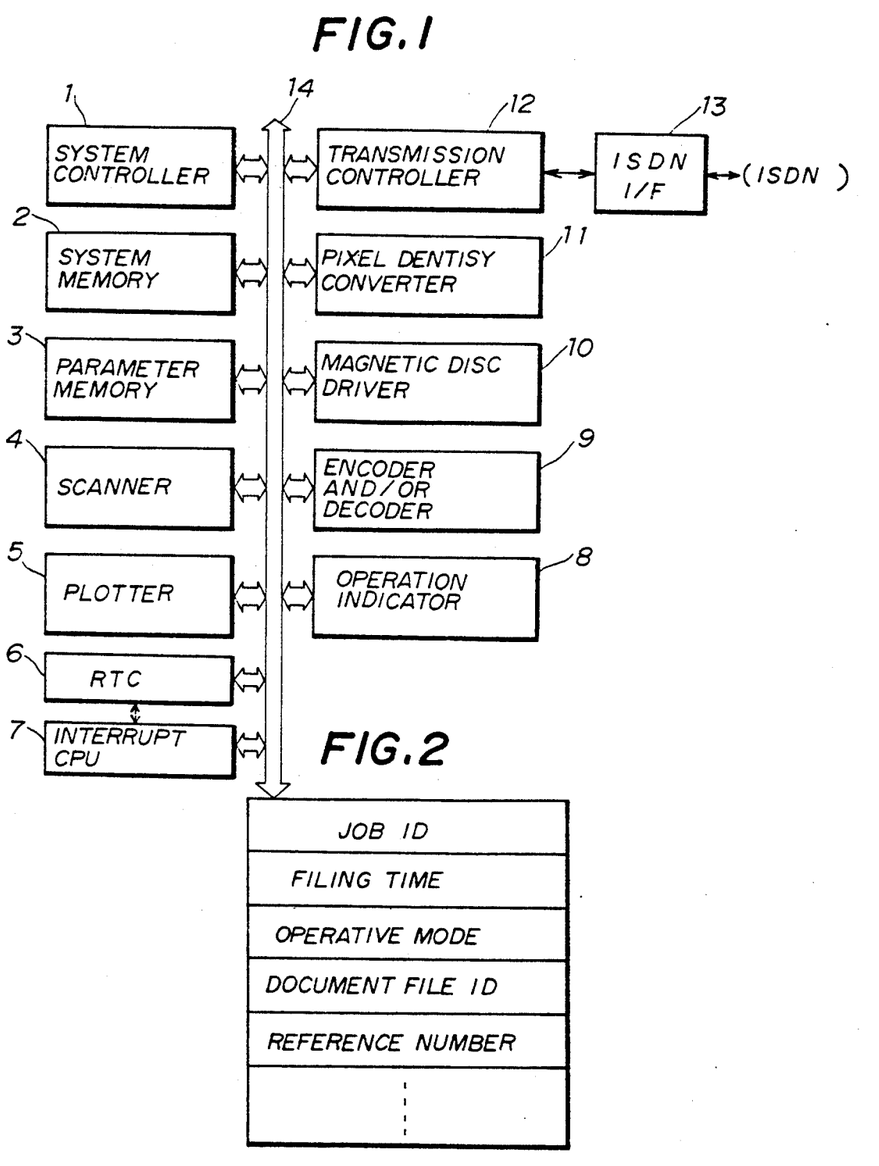
FIG. 1 shows a system block diagram of a facsimile apparatus according to the present invention.
FIG. 2 shows a job file stored in a system memory.

A facsimile apparatus (called FAX for short) shown in FIG. 1 serves as a group 4 facsimile apparatus (called G4 FAX for short), and a group 3 facsimile apparatus (called G3 FAX for short). The FAX is used for the ISDN. However, the FAX has a single transmission controller 12 so that data transmission concerning the G3 FAX cannot take place simultaneously with that concerning the G4 FAX. Incidentally, various messages of a circuit mode is defined in accordance with TTC.

A system controller 1 controls the general operation of each part of the FAX, and transmission procedures of the G3 FAX and the G4 FAX. A system memory 2 stores some programs used for the above procedures and various items of information required for executing the above programs therein. The system memory 2 functions as a working area of the system controller 1. A parameter memory 3, comprising a static random access memory (called SRAM for short), stores various items of information peculiar to the FAX. A scanner 4 scans a predetermined image with a predetermined resolution. A plotter 5 outputs the predetermined image with a resolution established by the G4 FAX. A real-time clock (abbreviated RTC hereinafter) 6 generates an interrupt signal at a periodic interval. An interrupt CPU 7, coupled to the RTC, transmits an interrupt trigger to the system controller 1 in synchronization with the interrupt signal from the RTC. An operation indicator 8, comprising various operation keys and indicators, indicates the operation of the FAX. An encoder and/or decoder 9 encodes image signals to form compressed image data and/or decodes the compressed image data to form the image signals. A magnetic disk driver 10 stores image signals from the scanner 4 or the compressed image data from the encoder and/or decoder 9. A picture element (called pixel for short) density converter 11 converts the pixel density to make the pixel density of images of this FAX equal to that of a communicatee terminal. A transmission controller 12 controls transmitting and/or receiving information via one of the B-channel and a D-channel. An ISDN interface circuit 13, coupled to the transmission controller 11, connects the FAX to the ISDN. Therefore, the transmission controller 11 functions as a signal processor of the layer 1 which combines and/or separates signals from a D-channel and one of the B-channels, and/or performs outgoing and/or incoming call control procedures. Additionally, the transmission controller 12 transmits the presence of a call establishment to the system controller 1. The transmission controller 12 can also execute transmission control procedures of layers 2, 3, 4, and 5. When the transmission controller 12 transmits the presence of the call establishment to the system controller 1, the system controller 1 instructs the transmission controller 12 to execute one of the transmission control procedures.

The system controller 1, system memory 2, parameter memory 3, scanner 4, plotter 5, RTC 6, interrupt CPU 7, operation indicator 8, encoder and/or decoder 9, magnetic disk driver 10, pixel density converter 11, and transmission controller 12 are coupled to the system bus 14, respectively, so as to be connected with one another.

The system controller 1 stores job files in the system memory 2. Each job file includes, as shown in FIG. 2, job identification information, filing time information, operative mode information, document file identification information, destination reference information, or the like. The job identification information identifies each job file. The filing time information indicates when the job file is filed. The operative mode information indicates the operative mode of the job. The operative mode information may include a polling transmission awaiting mode, a polling reception request mode. The term "polling", as used herein, means that a calling terminal receives image data from a called terminal. The document file identification information identifies each transmitted image data stored in the magnetic disk driver 10. The destination reference information indicates an ISDN number of a destination to be communicated to the facsimile apparatus. If the polling transmission awaiting request mode is set in the operative mode information, an ISDN number of a terminal which is to transmit the polling reception request may be set in the terminal reference information.

Figure 3A:
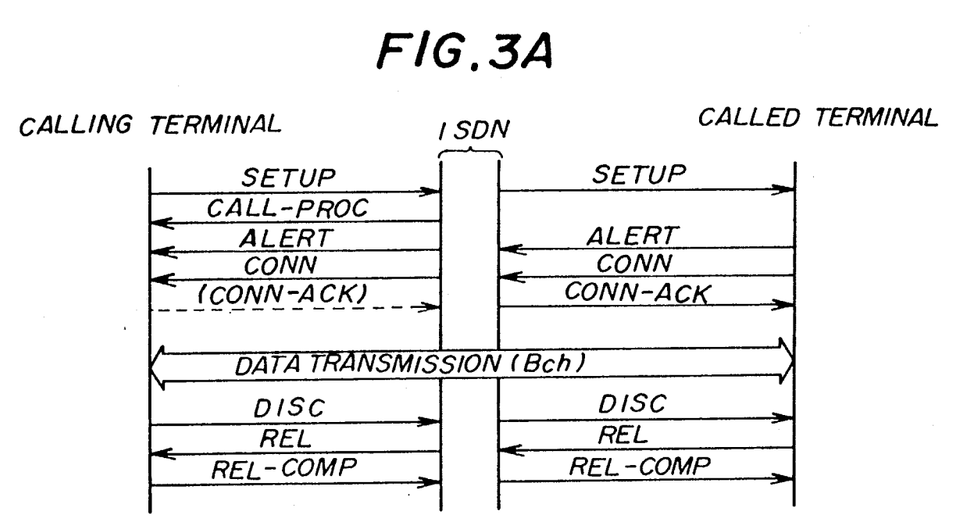
FIGS. 3A and 3B show time charts for explaining a general circuit-switched connection control procedure regarding an ISDN.

FIG. 3A shows a time chart for explaining a general circuit-switched connection control procedure regarding the ISDN. At first, a calling terminal establishes a line switching mode concerning a transmission mode. Subsequently, the terminal transmits a setup message (called SETUP for short) to the ISDN which designates a predetermined called terminal. The SETUP indicates the requirement of the call establishment between the calling and called terminals. In response, the ISDN transmits the SETUP to the called terminal so as to transmit an outgoing call. The ISDN transmits a call proceeding message (called CALL_PROC for short), which indicates the setup proceeding, to the calling terminal. On the other hand, the called terminal generally transmits an alerting message (called ALERT for short) to the ISDN in response to the incoming call. The ISDN transmits the ALERT to the calling terminal so as to inform it about the alert starting of the called terminal. Subsequently, the called terminal transmits a connect message (called CONN for short) to the ISDN, and the ISDN transmits the CONN to the calling terminal so as to inform it about the call proceeding of the called terminal. The ISDN transmits a connect acknowledge message (called CONN_ACK for short) to the called terminal so that one of the B-channels used for various data transmissions is established between the calling and called terminals. After a predetermined data transmission, the calling terminal transmits a disconnect message (called DISC for short) to the ISDN, and the ISDN transmits the DISC to the called terminal so as to inform it about the clearing of the B-channels. The called terminal transmits to the ISDN a release message (called REL for short) for clearing the B-channels. In response, the ISDN transmits the REL to the calling terminal. Lastly, the calling terminal transmits a release complete message (called REL_COMP for short) to the ISDN, and the ISDN transmits the REL_COMP to the called terminal. Consequently, one of the B-channels between the calling and called terminals is released completely.

Figure 3B:
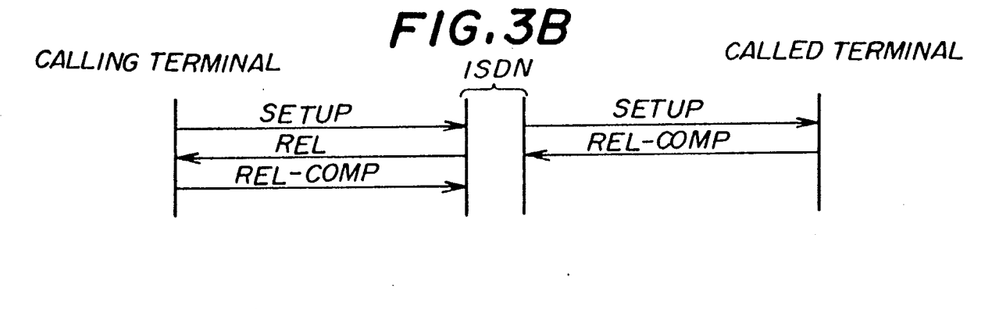

Incidentally, if the called terminal cannot transmit the ALERT in response to the SETUP from the ISDN, it transmits the REL_COMP to the ISDN, as shown in FIG. 3B. The REL_COMP includes the causes for the incapability of the ALERT. In response to REL_COMP, the ISDN transmits REL to the calling terminal. Consequently, the calling terminal transmits REL_COMP to the ISDN for disestablishment.

Figure 4A:
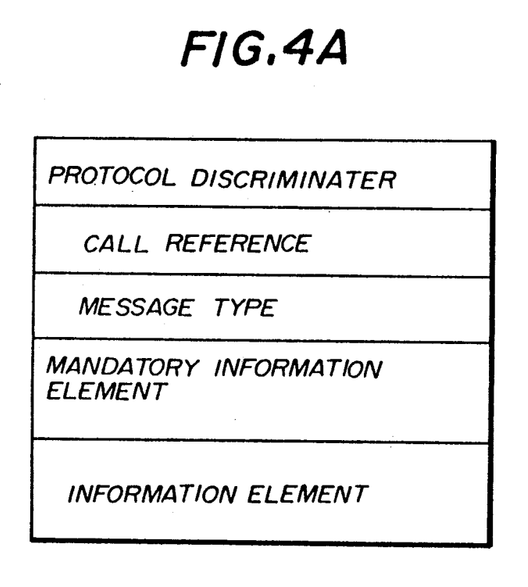
FIG. 4A shows general items of a setup message.

The SETUP of the ISDN comprises, as shown in FIG. 4A, a protocol discriminator, a call reference, a message type, a mandatory information element, and an information element. The protocol discriminator discriminates the protocol recommendations of the layer 3 call control message, such as a format and a sequence. The call reference discriminates which call the message relates to. The message type discriminates the content of each message. The mandatory information element is always part of each message. The information element is part of each message only when necessary. The number of the mandatory information elements is established in accordance with the message type, and the number of the information elements is established in accordance with the number of the mandatory information elements.

Figure 4B:
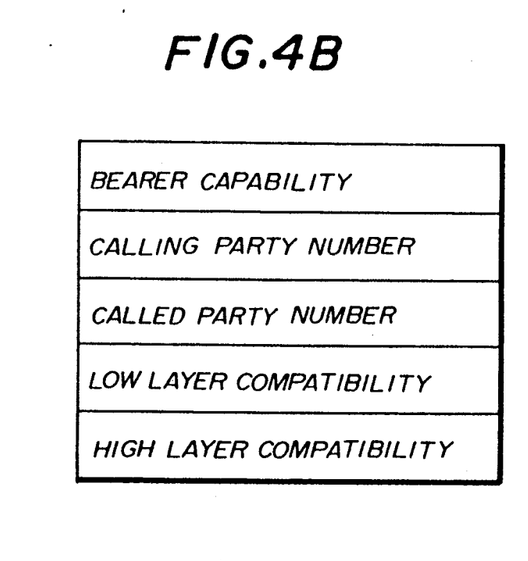
FIGS. 4B and 4C show general information elements.
Figure 4C:
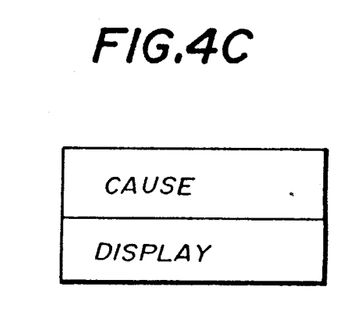

The SETUP also comprises, as shown in FIG. 4B, a bearer capability, a calling party number, a called party number, a low layer compatibility, a high layer compatibility, user-user, and the like. The bearer capability is a mandatory information element, and other elements belong to information elements. The bearer capability comprises an information transfer capability, a transfer mode, and a information transfer rate. The information transfer capability indicates the content of data t be transmitted, such as speech, unrestricted digital data, restricted digital data, 3.1 kHz audio, 7 kHz audio, and video. The transfer mode indicates whether a circuit switching or a packet switching is used. The bearer capability further comprises transfer type data and protocol data for users. The calling party number indicates an ISDN number of the calling terminal, and the called party number indicates that of the called terminal. The low layer compatibility, whose function is basically the same as that of the bearer capability, is mainly used for a communication test between the calling terminal and the called terminal. The high layer compatibility mainly used for the compatibility test therebetween, for example, the type of a terminal, such as a group 2/group 3 FAX, a G4 FAX, a mix mode, a teletex, a videotex, a telex, and message handling system, is indicated. The user-user is used for the information transmission among users. The user-user information is transmitted to a predetermined user of a destination without being interpreted by the ISDN. The user-user information includes, like the calling party number, the identification information representing the communicatee terminal The REL and the REL_COMP include a cause belonging to a mandatory information element and a display belonging to an information element. The cause includes the reason why the REL or REL_COMP is generated, a diagnostic which includes the reason why an error has occurred in the setup proceeding, or the like. The display indicates various items of information transmitted from the ISDN to a user.

Figure 5:
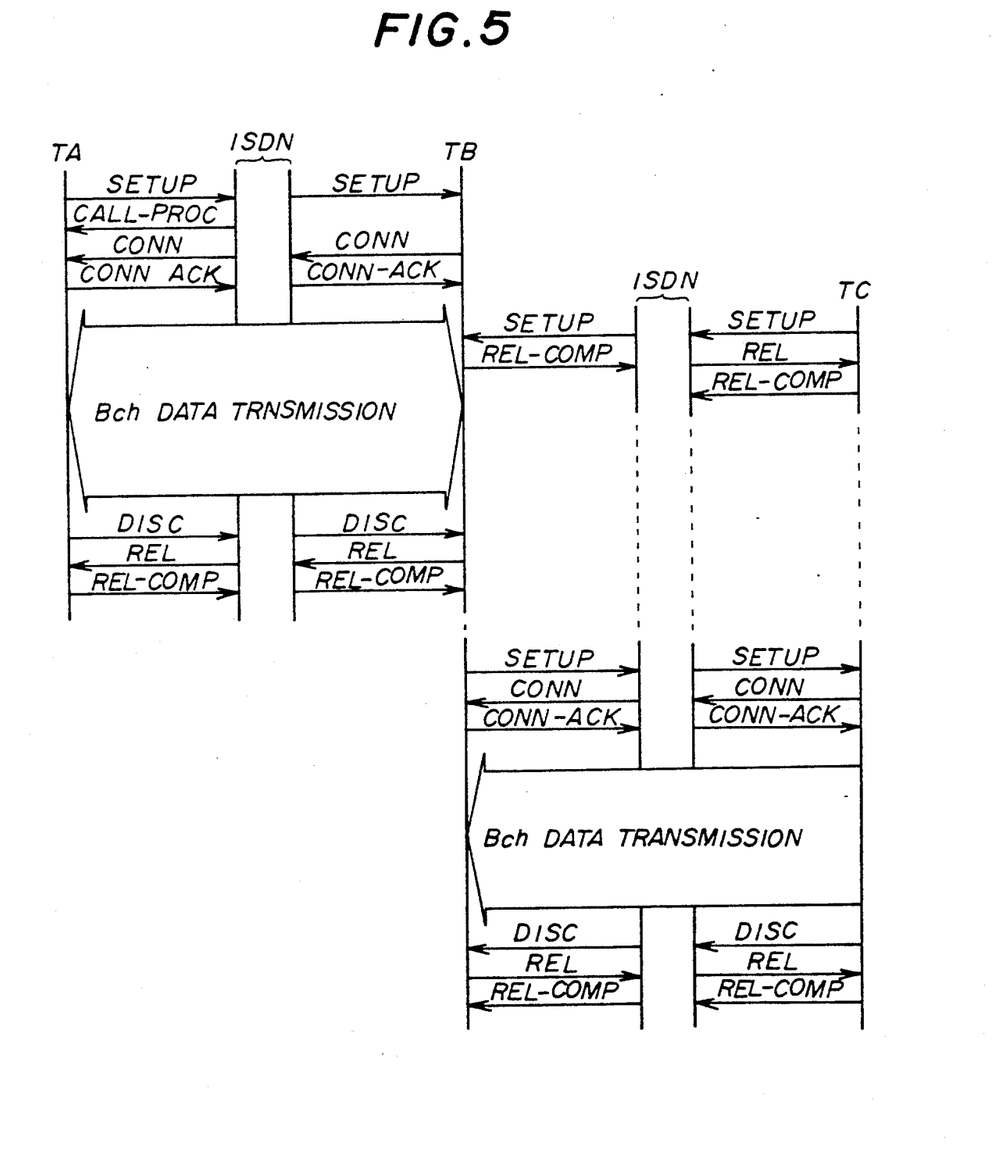
FIG. 5 shows a time chart for explaining a circuit-switched connection control procedure of a first embodiment according to the present invention.

The system controller 1 according to the present invention executes a procedure in response to the SETUP, as shown in FIG. 5. The system controller 1 adequately solves a case where, while the FAX (named TB hereinafter) is communicating with one terminal (named TA hereinafter), another terminal (named TC hereinafter) transmits an outgoing call to TB. Conveniently, TA, TB and TC are equipped with almost the same functions. In addition, no other terminal is connected to the ISDN. When TC transmits the outgoing call to TB during the data transmission between TA and TB, TB stores an ISDN number of Tc, which is set in a calling party number, in the system memory 2. In response, TB transmits the REL_COMP with its cause set as being a busy condition to the ISDN so that the outgoing call from TC is rejected. Then, the polling reception request mode is set in the operative mode of TA, and the calling party number representing TC is set in the destination reference information. As a result, the ISDN transmits the REL to the TC, and TC transmits the REL COMP responsive to the REL in order to disestablish.

TB may ignore an incoming call from TC. In this case, since the ISDN cannot obtain a CONN from TB within a predetermined time Ta since the ISDN transmits a SETUP thereto, the ISDN transmits a REL to TC. Subsequently, TC makes itself in the polling transmission awaiting mode, and indicates that TC itself is set in a polling transmission awaiting mode. TC may be kept in the polling transmission awaiting mode for a predetermined time $T_p$ when TC has received the REL. TC in the polling transmission awaiting mode is supposed to transmit the image data to TB in response to a predetermined outgoing call from TB. In the job file of TC, the polling transmission awaiting mode is set in the operative mode information, an ISDN number of TB is set in the destination reference information, and identification information of a transmission image data file is set in the document file identification information.

Figure 6:
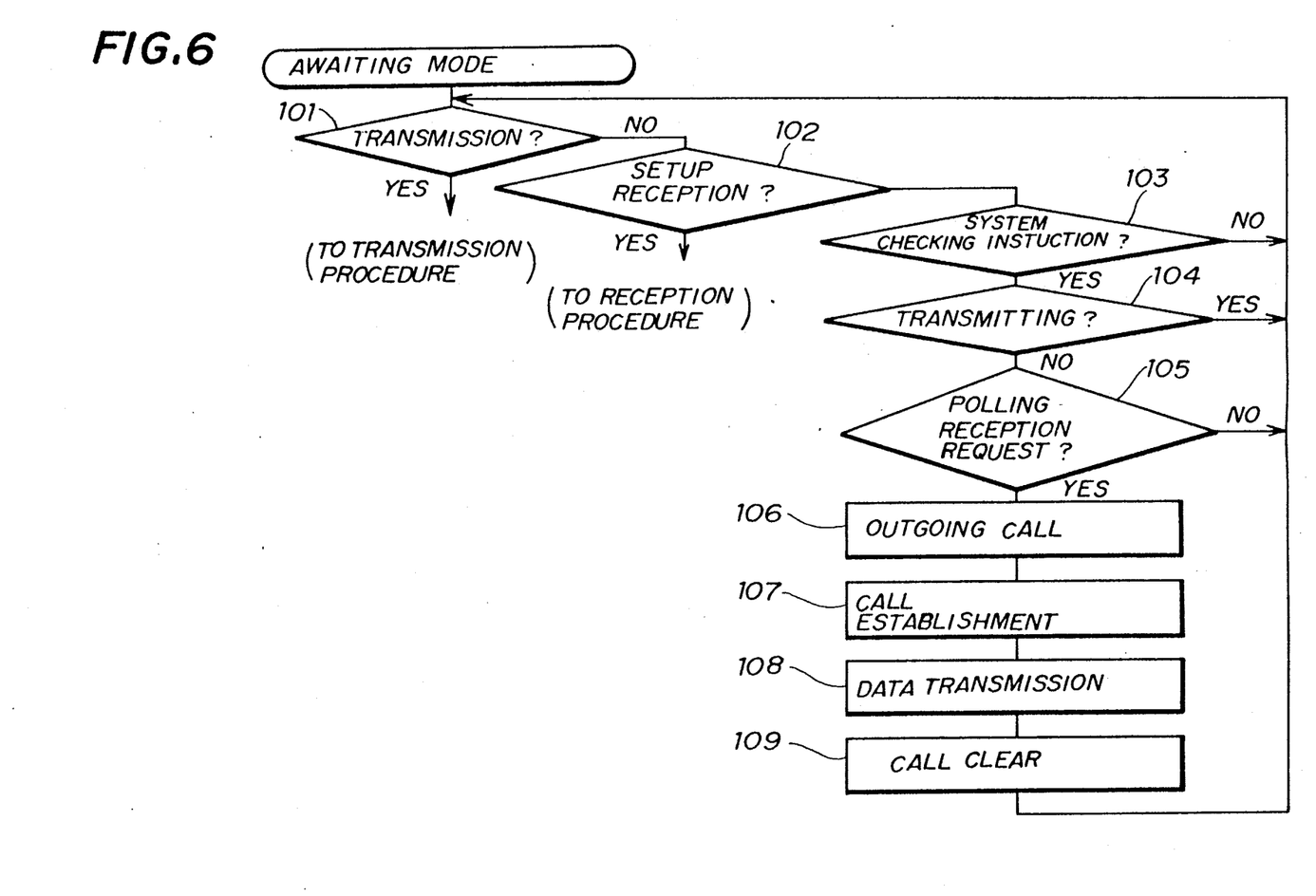
FIGS. 6 to 8 show procedures executed by a controller in accordance with the time chart in FIG. 5.
Figure 7:
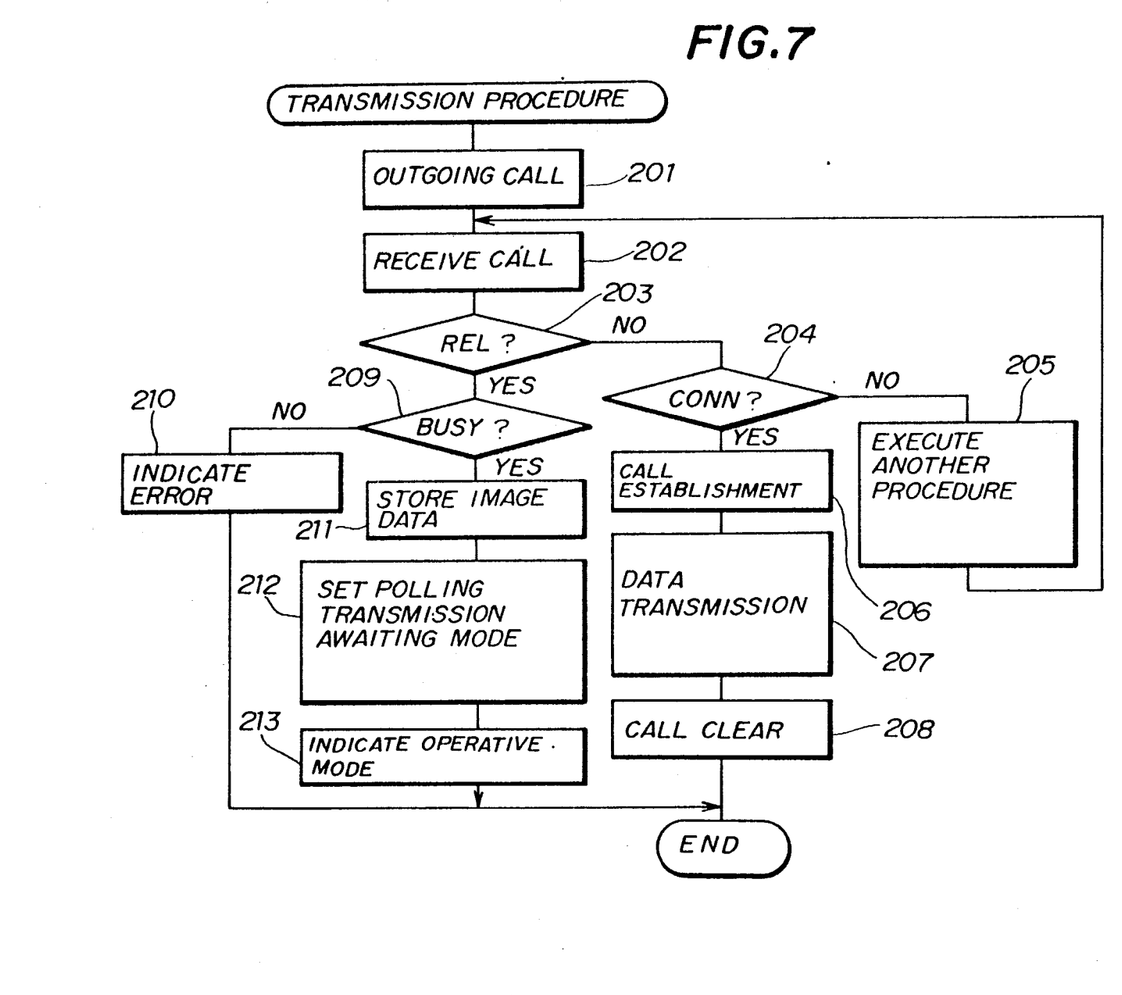
Figure 8:
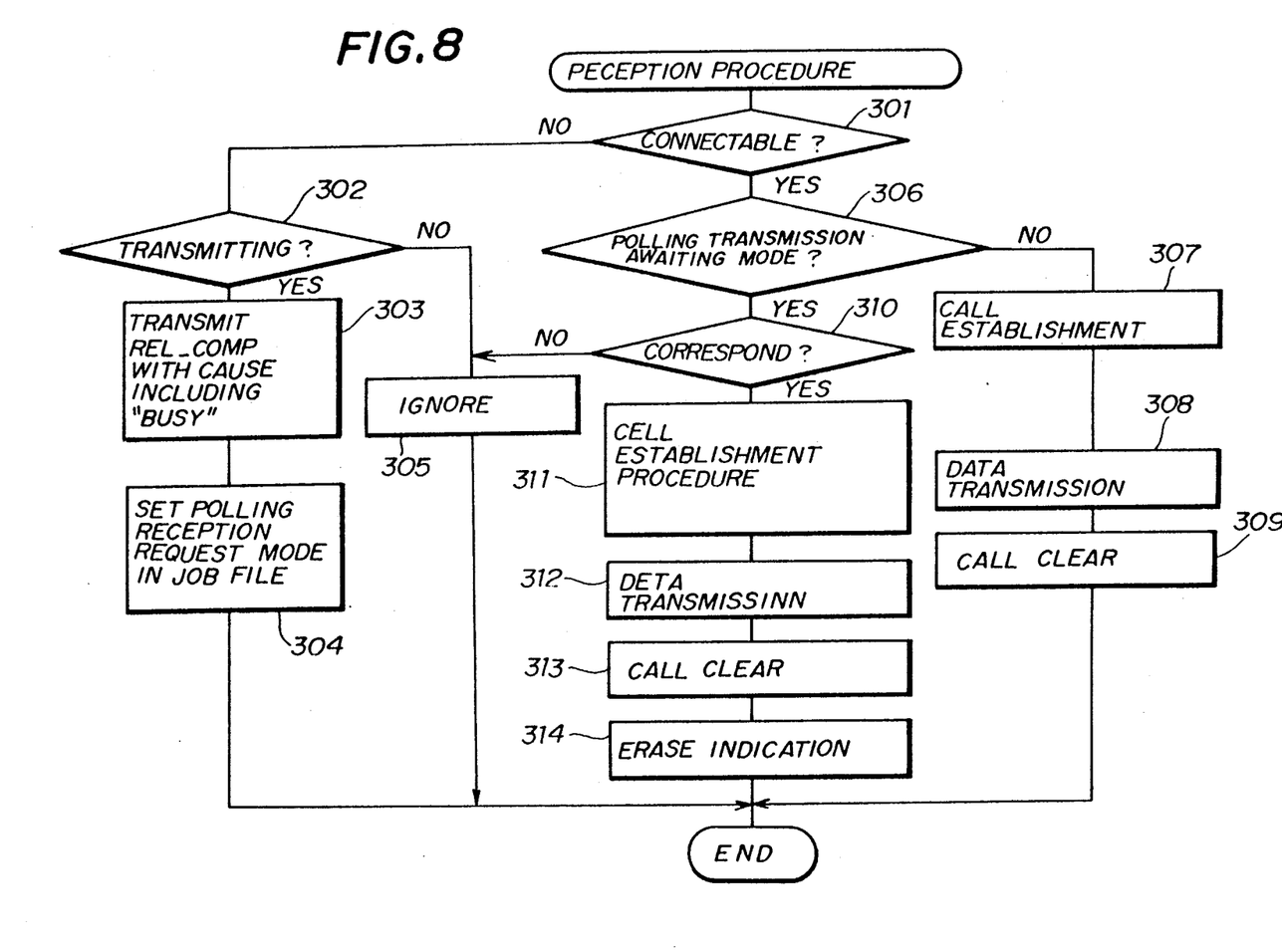

When the data transmission between TA and TB is finished, TB transmits an outgoing call to TC via the ISDN by means of the destination reference information in which the calling party number representing TC is set. As mentioned above, TC is set in the polling transmission awaiting mode. When TC receives the SETUP from ISDN, TC judges whether or not the calling party number representing TB corresponds to the destination reference number in the JOB file. If TC judges the calling party number corresponds to the destination reference number, TC transmits the image data file which is an object of the polling transmission awaiting mode. That is, when a B-channel is established between TC and TB, TC transmits the stored image data. In this way, according to the present invention, TC can transmit the image data to be transmitted to TB just after the data transmission between TA and TB so that TC can be prevented from transmitting SETUP more than twice and transmission efficiency is improved. A detailed description will now be given of the procedures of TB and TC with reference to FIGS. 6 to 8. FIG. 6 shows an awaiting procedure of the FAX according to the present invention. FIG. 7 shows a transmission procedure of the FAX according to the present invention. FIG. 8 shows a reception procedure of the FAX according to the present invention.

TA in the awaiting mode, as shown in FIG. 6, is waiting for one of the transmission instructed by a user, SETUP reception from the ISDN, and the presence of a system check instruction. If the transmission is instructed by the user so that a step 101 judges YES, the awaiting procedure is transferred to the transmission procedure in FIG. 7. Even if the step 101 judges NO, if TB receives the SETUP from the ISDN so that a step 102 judges YES, the awaiting procedure is transferred to the reception procedure in FIG. 8. There may be another step between the steps 101 and 102 to judges whether or not a function TB corresponds to that of TC by means of the bear capability, such as the 3.1 kHz audio indicating a G3 FAX, and the unristricted digital indicating a G4 FAX.

When the steps 101 and 102 respectively judge NO, a step 103 judges whether or not a system check instruction is given by the system controller 1. The system check instruction is periodically generated by the system controller 1 in synchronization with the interrupt trigger from the interrupt CPU 7. The system check instruction is a kind of trigger to check the presence of an executable job for TB. If the step 103 judges NO, a procedure is transferred to the step 101. Hereupon, how the steps 101, 102 and 103 are arranged is a matter of choice. Therefore, any step can be first. If the step 103 judges YES, a step 104 judges whether or not the data is being transmitted via the B-channel by means of the transmission controller 12. Because it is necessary for TB that the predetermined B-channel is idle when TB executes a predetermined job. If the step 104 judges NO, the procedure is transferred to the step 101. However, if the step 104 judges YES, a step 105 judges whether or not the polling reception request is set in the operative mode information of TB's job file. If the step 105 judges NO, the procedure is transferred to the step 101. However, if the step 105 judges YES, a step transmits an SETUP to the destination reference of the job file via the ISDN. As a result, a step 107 executes the call establishment procedure to establish the idle B-channel between TB and the communicatee terminal (TC) corresponding to the destination reference. Then a step 108 executes the data transmission procedure based on the polling reception request mode so that the image data is transmitted to TB from TC. After the data transmission, a step 109 executes a call clear procedure, and the procedure is transferred to the step 101.

If the step 101 judges YES, the procedure is transferred to the transmission procedure in FIG. 7. First, a step 201 transmits the SETUP to the designated terminal via the ISDN. Next, a step 202 receives a predetermined message in response to the SETUP thereof from the ISDN. Subsequently, a step 203 judges whether or not the predetermined message includes the REL. If the step 203 judges NO, a step 204 judges whether or not the predetermined message includes the CONN. If the step 204 judges NO, then a step 205 processes the predetermined message. However, if the step 204 judges YES, a step 206 executes the call establishment procedure, and a step 207 executes the data transmission procedure so that the image data is transmitted from TB to the communicatee. Then, a step 208 executes the call clear procedure so as to terminate the procedure.

If the step 203 judges YES, TB disestablishes by transmitting the REL_COMP. Then, a step 209 judges whether or not the cause includes the busy information. The busy information means that the communicatee terminal is communicating with another terminal. If the step 209 judges NO, a step 210 indicates an error since something is being wrong with the communicatee terminal, then the procedure ends. If the step 209 judges YES, a step 211 stores the image data to be transmitted by TB in the magnetic disk driver 10 as polling image data. Next, a step 212 sets the polling transmission awaiting mode in TB's job file. The step 212 also sets the called party number representing the communicatee terminal in the reference number of TB's job file. Lastly, a step 213 indicates that TB is set in the polling transmission awaiting mode, and the procedure ends. The image data is generated by the scanner 4 and the encoder and/or decoder 7.

If the step 102 judges YES, the awaiting procedure is transferred to the reception procedure shown in FIG. 8. First, a step 301 examines the SETUP, and judges whether or not TB is connectable to a communicatee terminal which has transmitted the SETUP thereto. If the step 301 judges NO, a step 302 judges the presence of the data transmission procedure between TB and another terminal (TA). If the step 302 judges YES, a step 303 transmits the REL COMP with the cause including the busy information to the communicatee terminal (TC) via the ISDN, and the incoming call is rejected. Then, a step 304 sets the polling reception request mode in TB's job file If the step 302 judges NO, a step 305 ignores the incoming call to terminate the procedure since something is being wrong with TB. If the step 301 judges YES, a step 306 judges whether or not the polling transmission awaiting mode is set in TB's job file. If the step 306 judges NO, a step 307 executes the call establishment procedure, and then a step 308 executes the data transmission procedure. After data transmission, a step 309 executes the call clear procedure to terminate the procedure. However, if the step 306 judges YES, a step 310 judges whether or not the calling party number of the communicatee terminal corresponds to the destination reference. If the step 311 judges NO, the procedure is transferred to the step 305. On the other hand, if the step 305 judges YES, a step 311 executes the call establishment procedure, and then a step 312 transmits the polling image data to the communicatee terminal. After the data transmission, a step 313 executes the call clear procedure, and a step 314 erases the indication of the polling transmission awaiting mode of TB.

The present invention is applicable, needless to say, to a G3 FAX used for the ISDN.

Further, the present invention is not limited to these preferred embodiments, but various variations and modifications may be made without departing from the scope of the present invention.

What is claimed is:

1. A facsimile apparatus for transmitting information to an external apparatus and/or receiving information therefrom via a transmission line, the information comprising first and second information, the first information comprising image data representing a predetermined image, the second information comprising control information by which said facsimile apparatus and the external apparatus are connected and/or disconnected with each other, the second information including identification information by which said facsimile apparatus and the external apparatus identify each other, the transmission line comprising a plurality of first channels through one of which the first information is transmitted, and at least one second channel through which the second information is transmitted, each of the first channels being operatively interconnectable to said facsimile apparatus and/or the external apparatus, the first information being transmitted simultaneously via no more than two of the first channels to which said facsimile apparatus is simultaneously operatively interconnectable, and the second channel being operatively interconnectable to said facsimile apparatus and/or the external apparatus, said facsimile apparatus comprising:

scanning means for scanning the predetermined image so as to generate the image data;

an interface operatively interconnectable to the transmission line;

a memory, coupled to said scanning means and interface, to store the first and/or second information therein;

first control means, operatively interconnected to said interface and memory, for controlling transmitting and/or receiving of the first and/or second information via said interface;

second control means, operatively interconnected to said first control means, for controlling said first control means, said second control means instructing the first control means, if first or second information is being transmitted between said first control means and a first external apparatus when said first control means receives the second information from a second external apparatus, not to connect said facsimile apparatus to the second external apparatus via one of the first channels, and to store first identification information representing the second external apparatus included in the second information from the second external apparatus in said memory, and said second control means instructing said first control means, after the transmission of the first information between said first control means and the first external apparatus, to transmit the second information to the second external apparatus by means of the first identification information stored in said memory in order to ask the second external apparatus to transmit the first information to said facsimile apparatus so that said first control means can receive the first information to be transmitted from the second external apparatus and the second external apparatus can be prevented from transmitting the second information more than twice to said facsimile apparatus; and plotter means, responsive to said first control means, for plotting the predetermined image appropriate to the image data which said first control means receives from the external apparatus.

2. A facsimile apparatus according to claim 1, wherein, when said first control means is instructed not to connect said first facsimile apparatus to the second external apparatus via one of the first channels, the first control means rejects the second information from the second external apparatus so that the second external apparatus cannot transmit the first information to said first control means.

3. A facsimile apparatus according to claim 1, wherein, when said first control means is instructed not to connect said first facsimile apparatus to the second external apparatus via one of the first channels, the first control means ignores the second information from the second external apparatus so that the second external apparatus cannot transmit the first information to said first control means.

4. A facsimile apparatus according to claim 1, wherein said second control means instructs, after said second control means instructs said first control means not to connect said facsimile apparatus to the second external apparatus, the first control means to transmit second identification information representing said facsimile apparatus to the second external apparatus.

5. A facsimile apparatus according to claim 1, wherein said second control means instructs the first control means, if said first control means transmits the second information to a third external apparatus when the first or second information is being transmitted between third and fourth external apparatuses so that the first control means cannot transmit the first information to the third external apparatus, to prepare to transmit the first information to the third external apparatus, and said second control means instructs the first control means, if the third external apparatus transmits the second information to said first control means in order to ask said facsimile apparatus to transmit the first information to said third external apparatus, to transmit the first information to the third external apparatus so that the third external apparatus can receive the first information to be transmitted from said facsimile apparatus and said facsimile apparatus can be prevented from transmitting the second information more than twice to the third external apparatus.

6. A facsimile apparatus according to claim 4, wherein said second control means instructs the first control means, if said first control means transmits the second information to a third external apparatus when the first or second information is being transmitted between third and fourth external apparatuses so that the first control means cannot transmit the first information to the third external apparatus, to prepare to transmit the first information to the third external apparatus, and said second control means instructs the first control means, if the third external apparatus transmits the second information to said first control means in order to ask said facsimile apparatus to transmit the first information to said third external apparatus, to transmit the first information to the third external apparatus so that the third external apparatus can receive the first information to be transmitted from said facsimile apparatus and said facsimile apparatus can be prevented from transmitting the second information more than twice to the third external apparatus.

7. A facsimile apparatus according to claim 6, wherein said second control means instructs said first control means, when said first control means transmits the second information to the third external apparatus, to store second identification information representing the third external apparatus, and said second control means instructs said first control means to transmit the first information to the third external apparatus only if identification information included in the second information transmitted from the third external apparatus to said first control means corresponds to the second identification information stored in said memory.

8. A facsimile apparatus according to claim 1, wherein the transmission line comprises an integrated services digital network.

9. A facsimile apparatus according to claim 8, wherein the first identification information comprises a calling party number defined by TTC.

10. A facsimile apparatus according to claim 8, wherein the first identification information comprises user-user information defined by TTC.

11. A facsimile apparatus according to claim 7, wherein the transmission line comprises an integrated services digital network.

12. A facsimile apparatus according to claim 11, wherein the second identification information comprises a called party number defined by TTC.

13. A facsimile communication system comprising:
a transmission line; and
a plurality of facsimile apparatus, operatively interconnected to said transmission line, each facsimile apparatus transmitting and/or receiving information to/from each other via said transmission line, the information comprising first and second information, the first information comprising image data representing a predetermined image, the second information comprising control information by which respective facsimile apparatus are connected and/or disconnected with each other, the second information including identification information by which respective facsimile apparatus identify each other, the transmission line comprising a plurality of first channels through one of which the first information is transmitted, and at least one second channel through which the second information is transmitted, each of the first channels being operatively interconnectable to each facsimile apparatus, the first information being transmitted simultaneously via no more than two of the first channels to which a facsimile apparatus can be simultaneously connected, and the second channel being operatively interconnectable to each facsimile apparatus, each facsimile apparatus comprising;
scanning means for scanning the predetermined image so as to generate the image data,
an interface operatively interconnectable to the transmission line,
a memory coupled to the scanning means and interface to store the first and/or second information therein,
first control means operatively interconnected to the interface and memory, for controlling transmitting and/or receiving of the first and/or second information via the interface,
second control means, operatively interconnected to the first control means, for controlling the first control means, and
plotter means, responsive to the first control means, for plotting the predetermined image appropriate to the image data which the first control means receives from the facsimile apparatus, and
when first or second information is being transmitted between first and second facsimile apparatuses when the first control means of the first facsimile apparatus receives the second information from a third facsimile apparatus, the second control means of the first facsimile apparatus instructs the first control means of the first facsimile apparatus not to connect the first facsimile apparatus to the third facsimile apparatus via one of the first channels, and to store first identification information representing the third facsimile apparatus included in the second information from the third facsimile apparatus in the memory of the first facsimile apparatus, and
after the transmission of the first information between the first and second facsimile apparatuses, the second control means of the first facsimile apparatus instructs the first control means of the first facsimile apparatus to transmit the second information to the third facsimile apparatus by means of the first identification information stored in the memory of the first facsimile apparatus in order to ask the third facsimile apparatus to transmit the first information to the first facsimile apparatus,
the second control means of the third facsimile apparatus instructing the first control means of the third facsimile apparatus, if the first control means of the third facsimile apparatus transmits the second information to the first facsimile apparatus when the first or second information is being transmitted between first and second facsimile apparatuses so that the first control means of the third facsimile apparatus cannot transmit the first information to the first facsimile apparatus, to prepare to transmit the first information to the first facsimile apparatus, and
the second control means of the third facsimile apparatus instructing the first control means of the third facsimile apparatus, if the first facsimile apparatus transmits the second information to the third facsimile apparatus in order to ask the third facsimile apparatus to transmit the first information to the first facsimile apparatus, to transmit the first information to the first facsimile apparatus so that the first facsimile apparatus can receive the first information to be transmitted from the third facsimile apparatus and the third facsimile apparatus can be prevented from transmitting the second information more than twice to the first facsimile apparatus.

14. A method for controlling facsimile apparatuses for transmitting and/or receiving information to/from each other via a transmission line, the information comprising first and second information, the first information comprising image data representing a predetermined image, the second information comprising control information by which facsimile apparatuses are connected with and/or disconnected from each other, the second information including identification information by which facsimile apparatuses identify each other, the transmission line comprising a plurality of first channels through one of which the first information is transmitted, and at least one second channel through which the second information is transmitted, each of the first channels being connectable to each facsimile apparatus, the first information being transmitted simultaneously via no more than two of the first channels to which a facsimile apparatus is simultaneously operatively interconnected, and the second channel being operatively interconnectable to each facsimile apparatus, said method comprising the steps of:
instructing a first facsimile apparatus, if first or second information is being transmitted between first and second facsimile apparatuses when the first facsimile apparatus receives the second information from a third facsimile apparatus, not to connect the first facsimile apparatus with the third facsimile apparatus;
instructing the first facsimile apparatus to memorize first identification information representing the third facsimile apparatus included in the second information from the third facsimile apparatus;

instructing the first facsimile apparatus, after the transmission of the first information between the first and second facsimile apparatuses, to transmit the second information to the third facsimile apparatus by means of the first identification information memorized in order to ask the third facsimile apparatus to transmit the first information to the first facsimile facsimile apparatus;

instructing the third facsimile apparatus, if the third facsimile apparatus transmits the second information to the first facsimile apparatus when the first or second information is being transmitted between the first and second facsimile apparatuses so that the third facsimile apparatus cannot transmit the first information to the first facsimile apparatus, to prepare to transmit the first information to the first facsimile apparatus; and instructing the third facsimile apparatus, if the first facsimile apparatus transmits the second information to the third facsimile apparatus in order to ask the third facsimile apparatus to transmit the first information to the first facsimile apparatus, to transmit the first information to the first facsimile apparatus so that the first facsimile apparatus can receive the first information to be transmitted from the third facsimile apparatus and the third facsimile apparatus can be prevented from transmitting the second information more than twice to the first facsimile apparatus.

15. A method according to claim 14, wherein said method further comprises the steps of:

instructing the first facsimile apparatus, after the first facsimile apparatus is instructed not to connect the first facsimile apparatus to the third facsimile apparatus, to transmit second identification information representing the first facsimile apparatus to the second facsimile apparatus, instructing the third facsimile apparatus, when the third facsimile apparatus transmits the second information to the first facsimile apparatus, to memorize the second identification information, and instructing the third facsimile apparatus to transmit the first information to the first facsimile apparatus only when identification information included in the second information transmitted from the first facsimile apparatus to the third facsimile apparatus corresponds to the second identification information memorized by the third facsimile apparatus.

16. A facsimile apparatus for transmitting information to an external apparatus and/or receiving information therefrom via a transmission line, the information comprising first and second information, the first information comprising image data representing a predetermined image, the second information comprising control information by which said facsimile apparatus and the external apparatus are connected and/or disconnected with each other, the second information including identification information by which said facsimile apparatus and the external apparatus identify each other, the transmission line comprising a plurality of first channels through one of which the first information is transmitted, and at least one second channel through which the second information is transmitted, each of the first channels being operatively interconnectable to said facsimile apparatus and/or the external apparatus, the first information being transmitted simultaneously via no more than two of the first channels to which said facsimile apparatus is simultaneously operatively interconnectable, and the second channel being operatively interconnectable to said facsimile apparatus and/or the external apparatus, said facsimile apparatus comprising:

scanning means for scanning the predetermined image so as to generate the image data;

an interface operatively interconnectable to the transmission line;

a memory, coupled to said scanning means and interface, to store the first and/or second information therein;

first control means, operatively interconnected to said interface and memory, for controlling transmitting and/or receiving of the first and/or second information via said interface;

second control means, operatively interconnected to said first control means, for controlling said first control means, said second control means instructing the first control means, if first or second information is being transmitted between said first control means and a first external apparatus when said first control means receives the second information from a second external apparatus, not to connect said facsimile apparatus to the second external apparatus via one of the first channels, and to store first identification information representing the second external apparatus included in the second information from the second external apparatus in said memory, and said second control means instructing said first control means, after the transmission of the first information between said first control means and the first external apparatus, to transmit the second information to the second external apparatus by means of the first identification information stored in said memory in order to ask the second external apparatus to transmit the first information to said facsimile apparatus so that said first control means can receive the first information to be transmitted from the second external apparatus and the second external apparatus can be prevented from transmitting the second information more than twice to said facsimile apparatus.

* * * * *